(12) United States Patent
Tanaka

(10) Patent No.: US 8,025,750 B2
(45) Date of Patent: Sep. 27, 2011

(54) RETREADED TIRE AND METHOD FOR PRODUCING SAME

(75) Inventor: Tsutomu Tanaka, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 739 days.

(21) Appl. No.: 12/065,404

(22) PCT Filed: Aug. 23, 2006

(86) PCT No.: PCT/JP2006/316491
§ 371 (c)(1),
(2), (4) Date: Jul. 15, 2008

(87) PCT Pub. No.: WO2007/029501
PCT Pub. Date: Mar. 15, 2007

(65) Prior Publication Data
US 2009/0294002 A1    Dec. 3, 2009

(30) Foreign Application Priority Data

Sep. 1, 2005   (JP) ................................. 2005-253064

(51) Int. Cl.
*B29D 30/54*   (2006.01)
(52) U.S. Cl. ............... 156/64; 156/75; 156/96; 156/130
(58) Field of Classification Search ............ 156/75, 156/96, 129, 130; 152/209.6, 154.1
See application file for complete search history.

(56) References Cited

U.S. PATENT DOCUMENTS
2002/0088527 A1   7/2002 Tanaka et al.

FOREIGN PATENT DOCUMENTS
| | | |
|---|---|---|
| JP | 56-117637 A | 9/1981 |
| JP | 08-230072 A | 9/1996 |
| JP | 08-304009 A | 11/1996 |
| JP | 2002-086586 A | 3/2002 |
| WO | WO-2004/052633 A1 * | 6/2004 |

OTHER PUBLICATIONS

Chinese Office Action dated Nov. 20, 2009, with translation (12 pages.)

* cited by examiner

*Primary Examiner* — Geoffrey L Knable
(74) *Attorney, Agent, or Firm* — Sughrue Mion, PLLC

(57) ABSTRACT

A retreaded tire capable of improving unbalance of the tire is efficiently produced.

Retread rubber has the largest thickness in a joint part F on the circumference. Such a joint part F is arranged in a minimal location S (corresponding to a light location of static unbalance), in which a rubber gauge G as measured in a radial direction of the tire from a buffed surface K of a base tire D to an outer surface of an outermost belt cord L embedded in an outermost belt layer disposed in a radially outermost side among belt layers constituting a belt is minimal on the circumference in an equatorial plane of the tire in attaching so that the total rubber gauge of the retread rubber T at the joint part F surely approaches total rubber gauges at other locations on the circumference to effectively reduce unbalance.

5 Claims, 4 Drawing Sheets

37···measurement sensor
D···base tire
F···joint part
K···retreading surface
S···minimal location
T···retread rubber M···tread rubber
Z···used tire 37···measurement sensor
D···base tire
F···joint part
K···retreading surface
S···minimal location
T···retread rubber G···rubber gauge
L···belt cord

RETREADED TIRE AND METHOD FOR PRODUCING SAME

TECHNICAL FIELD

The present invention relates to a retreaded tire configured by removing a tread from a used tire to give a base tire and attaching retread rubber on a buffed surface of said base tire, and to a method for producing same.

RELATED ART

A conventional retreaded tire and its method are known from, for example, JP 8-230072 A.

Such a retreaded tire is generally produced by mounting a used tire on a buffing machine, removing its tread rubber in a buffing process to form a base tire whose buffed surface is exposed, mounting said base tire on a tire retreading machine, applying strip-like retread rubber on the buffed surface, attaching the retread rubber on said buffed surface over the entire circumference of the tire and vulcanizing the base tire provided with the retread rubber.

DISCLOSURE OF THE INVENTION

In the above-mentioned buffing process of tread rubber of a used tire, bead portions of the used tire sit on a rim of a buffing machine. In this case, a tread portion of the used tire sometimes has an irregular surface in the circumferential direction of the tire due to a manufacturing error, long-term use or the like or the bead portions sometimes sit on the rim off from a regular fitting location in the radial direction of the tire.

In such a state, when the used tire is rotated to remove its tread rubber in the buffing process, a rubber gauge on a belt cord varies from location to location in the circumferential direction of the tire to lose a balance of the base tire. However, no attention has been paid to this unbalance in course of attaching a retread rubber to such a base tire. Therefore, there has been a problem that a location of attaching a leading end part of the retread rubber is always incidentally determined depending on a setting location of the base tire in a tire retreading machine so that a retreaded tire inherits the unbalance of said base tire as it is.

The present invention aims to provide a retreaded tire, in which unbalance is reduced and a method for efficiently producing such a retreaded tire.

In order to achieve the above-mentioned object, a retreaded tire according to the present invention comprises
a base tire configured by removing tread rubber from an used tire having a belt consisting of at least one belt layer and the tread rubber and
retread rubber attached to a buffed surface of the base tire over an entire circumference of the buffed surface, from which the tread rubber has been removed, wherein
a joint part which is a trailing end part of attaching the precured tread is arranged to agree with a location where a rubber gauge as measured in a radial direction of the tire from the buffed surface to an outer surface of an outermost belt cord embedded in an outermost belt layer disposed in a radially outermost side among belt layers constituting the belt is minimal on the circumference in an equatorial plane of the tire.

In addition, a method for producing a retreaded tire according to the present invention comprises steps of
removing tread rubber from an used tire having a belt consisting of at least one belt layer and the tread rubber to obtain a base tire,
measuring a rubber gauge, as measured in a radial direction of the tire from a buffed surface to an outer surface of an outermost belt cord embedded in an outermost belt layer disposed in a radially outermost side among belt layers constituting the belt, on the buffed surface of the base tire over an entire circumference of the buffed surface, from which the tread rubber has been removed,
attaching retread rubber on the buffed surface of the base tire over the entire circumference of the buffed surface with its leading end part being arranged to agree with a location in an equatorial plane of the tire where the rubber gauge is minimal on the circumference, so that a joint part of the retreaded tread rubber is arranged in the minimal location of the rubber gauge, and
vulcanizing the base tire to which the retread rubber has been attached to obtain a retreaded tire.

In the present invention, after said rubber gauge is measured on the buffed surface of the base tire over the entire circumference, the retread rubber is attached on the buffed surface of the base tire over the entire circumference with its leading end part being arranged in the location, in which the rubber gauge is minimal on the circumference, thereby, the joint part of the retread rubber is arranged in the minimal location of the rubber gauge. In the joint part of the retreaded tread rubber, in order to surely join the leading end and trailing end parts across the full width, the leading end and trailing end parts are slightly overlapped with each other or have a little margin even in the case of abutting joint, so that the thickness of the retread rubber in the joint part is the largest on the circumference.

By agreeing the joint part where the thickness of the retread rubber is the largest on the circumference with the minimal location where said rubber gauge is minimal on the circumference (corresponding to a light point in terms of static unbalance), the total rubber gauge at the joint part surely approaches total rubber gauges at other locations on the circumference to effectively reduce unbalance. In addition, by measuring said rubber gauge to obtain the light point (minimal weight point), this process can be performed in a short time and operation efficiency is improved.

By using a method according to claim 3, the buffed surface of the base tire in measuring the rubber gauge is never contaminated to enable to avoid attachment failure between the base tire and the retread rubber.

By using a method according to claim 4, the rubber gauge on the belt cord can be measured with a high degree of accuracy as well as at low cost.

By using a method according to claim 5, as compared to the case where the sensor is rotated around the base tire for measurements, the configuration of a measurement means becomes simple and measurement accuracy is improved.

By using a method according to claim 6, the rubber gauge on the belt cord can be measured with a high degree of accuracy even in different kinds of used tires.

By using a method according to claim 7, the measuring process and the attaching process can be performed substantially at the same time to improve the operation efficiency.

By using a method according to claim 8, the measuring process and the removing process can be performed substantially at the same time to improve the operation efficiency and to facilitate the subsequent attaching process of retread rubber.

Hereinafter, embodiments of the present invention will be described with reference to drawings.

Figure 1:
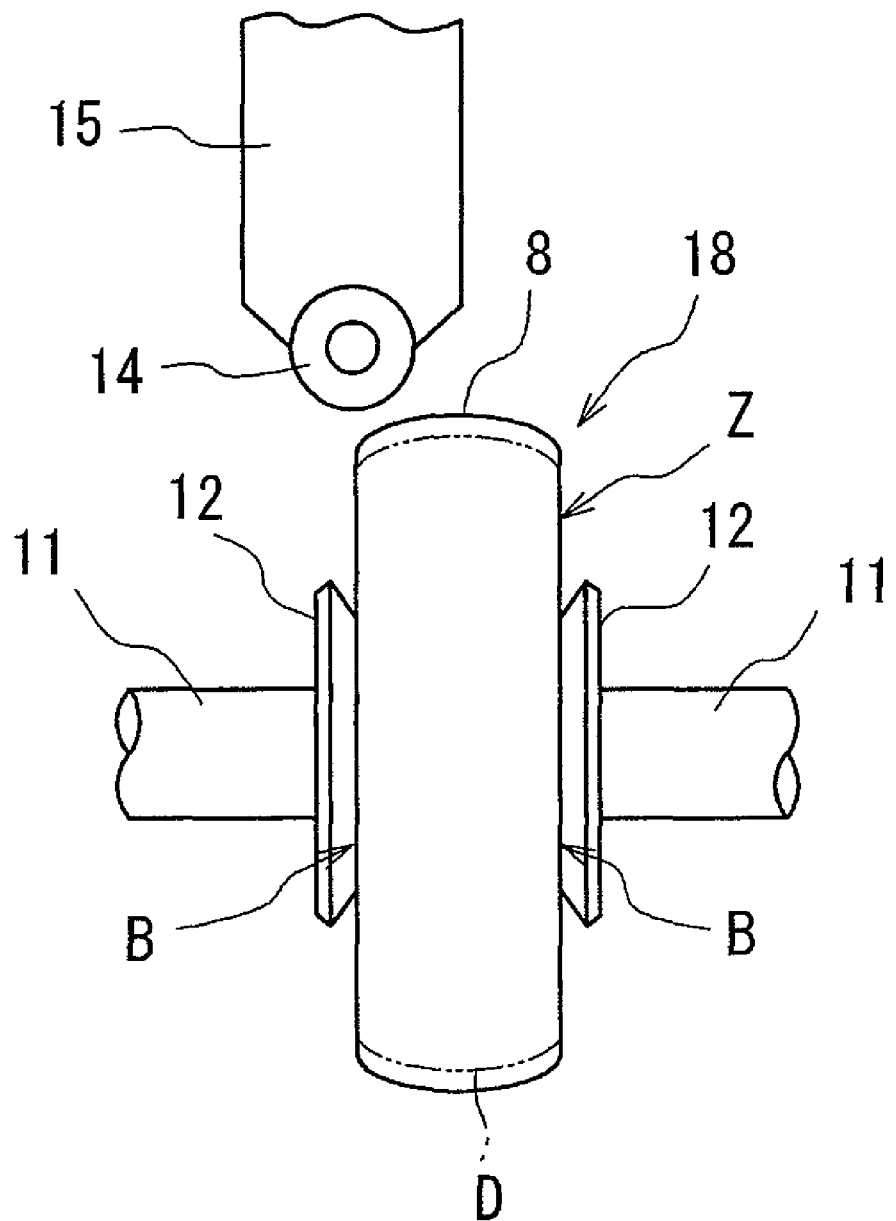
FIG. 1 is a partial plan view of a buffing machine showing an embodiment of the present invention.

In an embodiment shown in FIG. 1, the reference numeral 11 denotes a pair of main shafts 11 rotatably and axially movably supported by a frame (not shown), and the main shafts 11 extend concentrically and horizontally. Supporting rims 12 are respectively fixed to the end portions of these main shafts 11, which are adjacent to each other. Both bead portions B of a used tire Z sit on these supporting rims 12 so that the used tire Z is supported by the pair of supporting rims 12.

In the case where the used tire Z filled with a given internal pressure is supported by said supporting rims 12, when the main shafts 11 are subjected to a driving force by a driving means not shown to be rotated, the supporting rims 12 are rotated in conjunction with the used tire Z with the rotation axis of the used tire Z being as its center.

A filing type of a buff rotating body (rasp) 14 connected to a horizontally movable arm 15 can be rotated by a driving force by a motor (not shown). As mentioned above, in the case where the used tire Z is rotated with the rotation axis thereof being as its center, the buff rotating body 14 is moved with the arm 15 along the outer surface of the used tire Z while it is rotated, to remove tread rubber M of the used tire Z and to give a base tire D.

Figure 2:
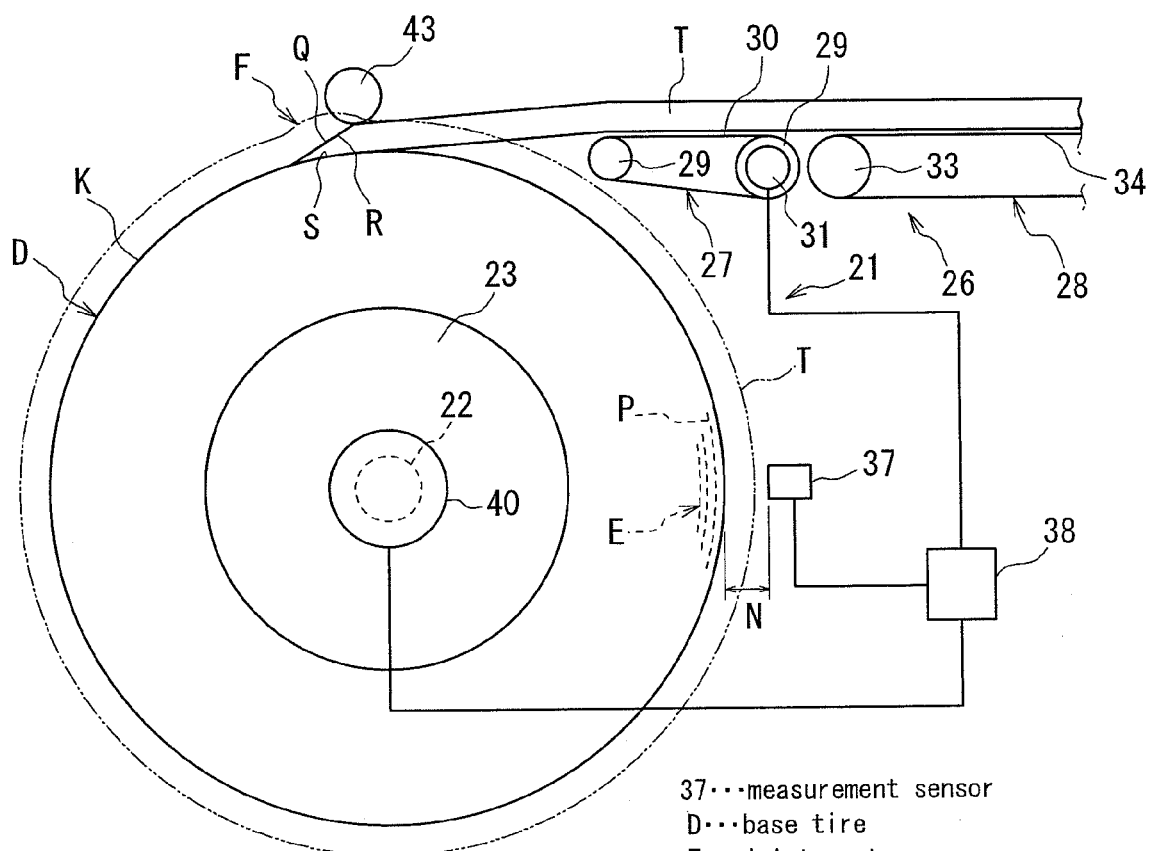
FIG. 2 is a schematic side view of a tire retreading machine and a base tire.
Figure 3:
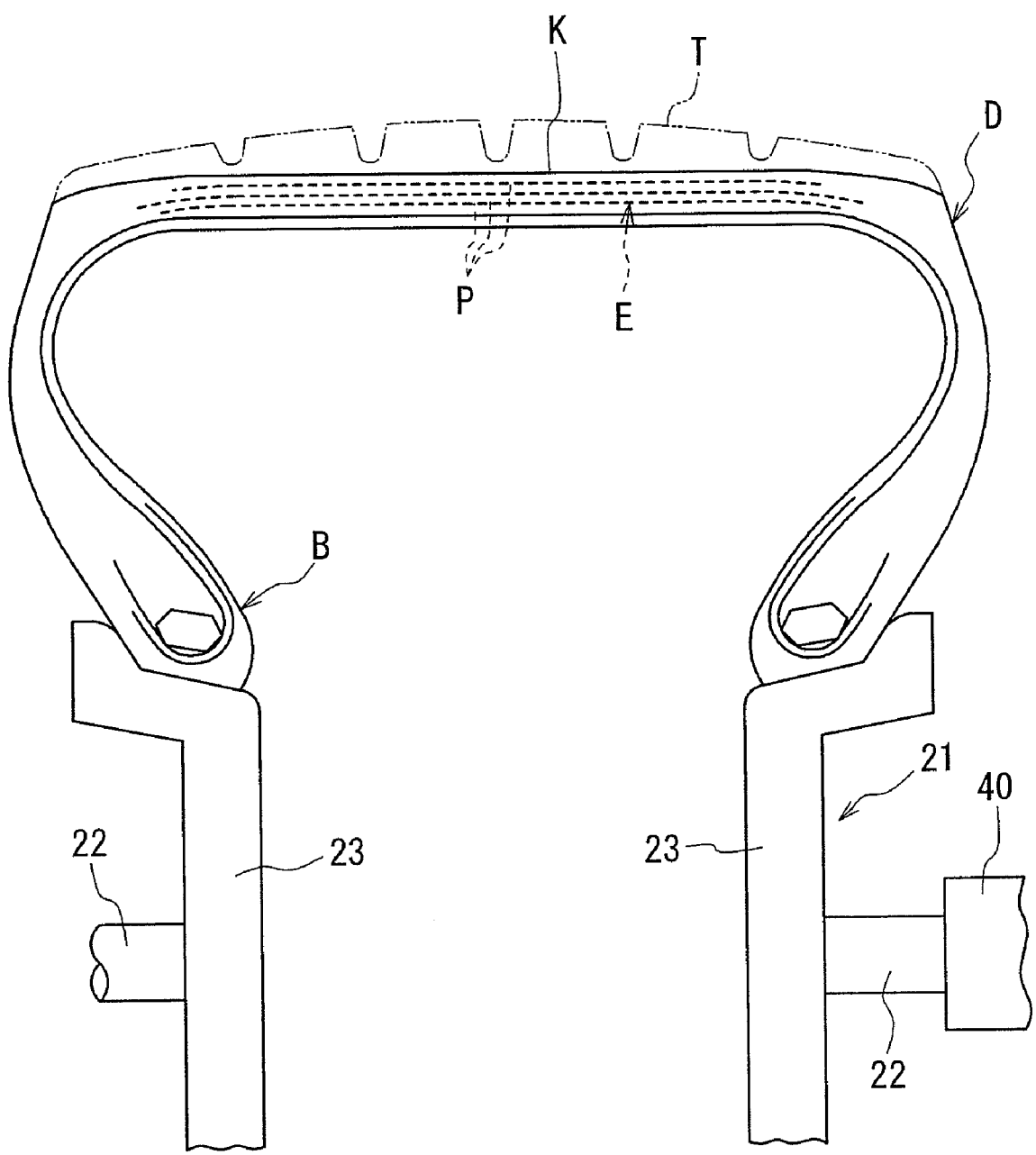
FIG. 3 is a sectional front view of a base tire.

In this way, when the tread rubber M is removed from the used tire Z, as shown in FIGS. 2 and 3, in a tread portion of the base tire D, a belt E, more strictly, an outermost belt layer P located outermost in the radial direction among belt layers constituting the belt E is substantially exposed so that this exposed surface becomes a buffed surface K. The above-mentioned frame, the main shafts 11, the supporting rims 12, the buff rotating body 14 and the arm 15 constitute a buffing machine 18 for removing the tread rubber M from the used tire Z to give the base tire D.

As mentioned above, when the tread rubber M is removed from the used tire Z to give the base tire D, said base tire D is removed from the buffing machine 18 and then conveyed to a tire retreading machine 21 by a conveying means (not shown). Said tire retreading machine 21 has a pair of main shafts 22 supported by a frame (not shown) to be rotatable and movable in the axial direction, which expands concentrically and horizontally.

Supporting rims 23 are respectively fixed to the end portions of these main shafts 22, which are adjacent to each other. Both bead portions B of the base tire D sit on these supporting rims 23 so that the base tire D is supported by the pair of supporting rims 23. In the case where the base tire D filled with a given internal pressure is supported by said supporting rims 23, when the main shafts 22 are subjected to a driving force by a driving means not shown to be rotated, the supporting rims 23 are rotated in conjunction with the base tire D with the rotation axis of the base tire D being as its center.

A horizontal conveyor 26 supported by said frame expands in the machine direction. There is provided, on this conveyor 26, strip-like retread rubber T having a given sectional shape, which is to be attached to the buffed surface K of said base tire D. Said retread rubber T may be a tread made of unvulcanized rubber just extruded by an extrusion machine or a precured tread which is vulcanized after extruded by the extrusion machine.

Said conveyor 26 consists of a first conveyor 27 provided in one side close to the base tire D and a second conveyor 28 provided in the other side distant from the base tire D on an extension of the first conveyor 27. The first conveyor 27 has a pair of rollers 29 distantly positioned in the machine direction and a belt 30 wrapped around these rollers 29. A motor 31 is coupled to the rear side of the motor 29 as a driving mechanism. Due to this configuration, when said motor 31 is activated and the belt 30 moves forward, the retread rubber T provided on the first conveyor 27 is conveyed to the base tire D and applied to the buffed surface K of said base tire D.

On the other hand, said second conveyor 28, similar to the first conveyor 27, has a pair of rollers 33, a belt 34 wrapped around these rollers 33 and a motor coupled to a rear side of the motor 33 not shown. When the motor is activated in sync with the motor 31 of said first conveyor 27, the retread rubber T on the second conveyor 28 is conveyed to the base tire D in conjunction with the first conveyor 27.

Figure 4:
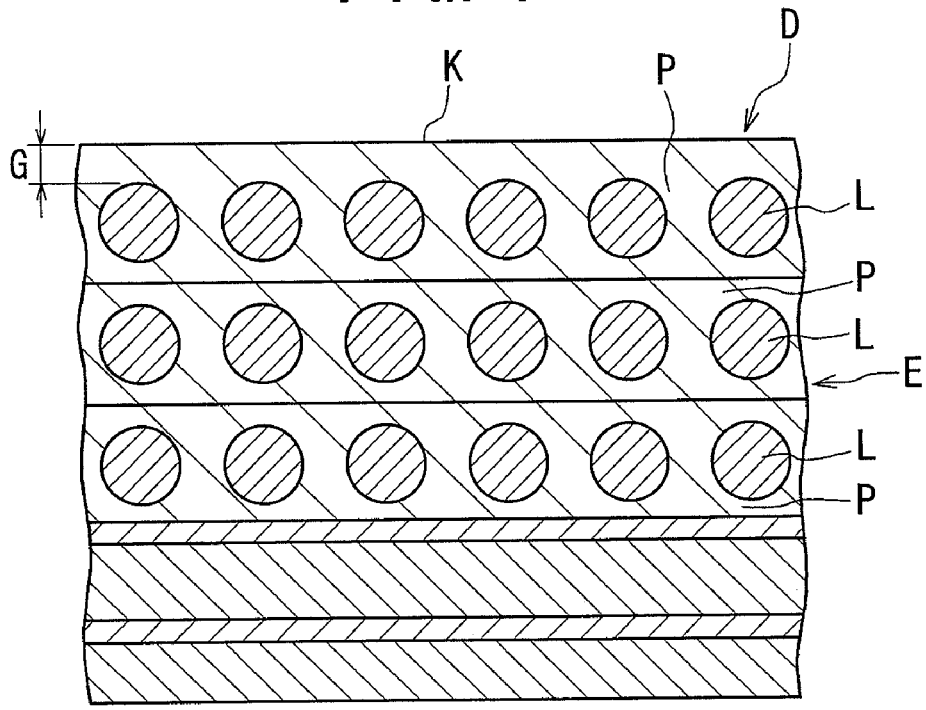
FIG. 4 is a sectional view of a base tire near belt layers.

Said frame immediately below said conveyor 26 as well as immediately after the base tire D is provided with a measurement sensor 37 comprising a contactless eddy-current displacement sensor. With this measurement sensor 37, a rubber gauge G (refer to FIG. 4) on an outermost belt cord L on the buffed surface K is measured in the following way.

That is, said measurement sensor 37 generates eddy-current in the outermost belt cord L which is the closest to the measurement sensor 37 among belt cords (steel cords) in the base tire D, that is, the outermost belt cord L in an outermost belt layer P located in the radially outermost side, measures the distance from the measurement sensor 37 to said belt cord L and outputs a measurement signal (voltage) to a control means 38.

In this way, when the measurement signal is output from the measurement sensor 37 to the control means 38, said control means 38 computes based on a known distance N from the measurement sensor 37 to the buffed surface K of the base tire D and said measurement signal by using a given arithmetic expression and provides a rubber gauge G on the outermost belt cord L on the buffed surface K, that is thickness of the remaining rubber from said outermost belt cord L to the buffed surface K.

By using an arithmetic expression depending of a kind (size, manufacturers and the like) of used tire as the above-mentioned arithmetic expression, even in a different kind of used tire Z, the rubber gauge G on the belt cord L can be measured with a high degree of accuracy. In some base tires D, rubber filled in a skive hole for the repair of an injury or the like projects from the buffed surface K. In this case, when the rubber gauge G is measured in the above-mentioned way, the computing is performed without such a projecting part.

As mentioned above, when said rubber gauge G is measured with the measurement sensor 37, the base tire D is rotated at one or more revolutions at a constant speed around its rotation axis and information about a rotational position of the base tire D is made output from an encoder 40 coupled to the main shaft 22 to the control means 38. As a result, said rubber gauge G of the base tire, which is facing the measurement sensor 37, in each location in the circumferential direction is measured over the entire circumference of the base tire D. Afterward, the control means 38 provides a minimal location S, in which said rubber gauge G is minimal on the circumference in an equatorial plane of the tire based on the above-mentioned measurement results.

When the rubber gauge G is measured in a state that the measurement sensor 37 remains still as mentioned above and the base tire D is rotated, as compared with the case where the measurement sensor is rotated around the base tire for measurements, the configuration of a measurement means becomes simple and measurement accuracy is improved. When said rubber gauge is measured with the measurement sensor 37, it is generally measured continuously in the circumferential direction of the tire but may be measured at given intervals, for example in 180 to 360 points per one rotation.

When the rubber gauge G is measured with a contactless measurement sensor 37 as mentioned above, as compared with the case of using a contact measurement sensor, the buffed surface K of the base tire D in measuring the rubber gauge G is never contaminated to enable to avoid attachment failure between the base tire D and the retread rubber T in attaching the retread rubber T to the base tire D. In addition, as mentioned above, when an eddy-current displacement sensor is used as the contactless measurement sensor 37, said rubber gauge G can be measured with a high degree of accuracy as well as at low cost.

As mentioned above, by providing the measurement sensor 37 just under the conveyor 26 as well as just after the base tire D, the measuring the rubber gauge G on the belt cord L and the attaching the retread rubber T to the buffed surface K are separately performed in circumferentially distant locations of the same tire so that the measuring process and the attaching process can be performed substantially at the same time to improve the operation efficiency.

As mentioned above, when the minimal location S is obtained, the control means 38 outputs a control signal to the both motors 31 of the conveyor 26 and then makes the first and second conveyor 27, 28 start moving at a given time. As a result, by the conveyor 26 the retread rubber T is conveyed to the rotating base tire D and its leading end part Q is applied to the buffed surface K of the base tire D so that the leading end part Q of the retread rubber T is matched to said minimal location S of the base tire D since the control means 38 controls the conveyor 26 as mentioned above.

In this state, the base tire D is rotated and the conveyor 26 moves, the retread rubber T is continuously applied to the buffed surface K of the base tire D and attached to said buffed surface K by being pressed against the retreaded surface K by a pressing roller 43. When the retread rubber T is attached to the buffed surface K over the entire circumference as a virtual line shows in FIG. 2, the leading end part Q of the retread rubber T and a joint part R, which is a trailing end part of the retread rubber T are mutually joined with each other to form a joint part F. In the joint part F of the retreaded tread rubber T, in order to surely join the leading end and trailing end parts Q, R across the full width, the leading end and trailing end parts Q, R are slightly overlapped with each other or have a little margin even in the case of abutting joint, thereby, the thickness of the retread rubber T in the joint part F is the largest on the circumference.

By agreeing the joint part F where the thickness of the retread rubber T is the largest with the minimal location S where the rubber gauge G on the outermost belt cord L is minimal on the circumference (corresponding to a light location of static unbalance), the total rubber gauge at the joint part F surely approaches total rubber gauges at other locations on the circumference to effectively reduce unbalance. In addition, by measuring the rubber gauge G on the belt cord L to obtain the light location (minimal location S), this process can be performed in a short time and operation efficiency is improved.

Afterward, the base tire D provided with the retread rubber T is dismounted from the tire retreading machine 21, conveyed to a vulcanizing machine by a conveying machine not shown and installed in said vulcanizing machine. Next, said retread rubber T and the base tire D are vulcanized to produce a retreaded tire. In this way, the retreaded tire can be produced, in which the joint part F of the retread rubber T is agreed with the minimal location, in which the rubber gauge G on the belt cord L is minimal on the circumference. Thus-produced retreaded tire can reduce the above-mentioned unbalance and effectively prevent generation of vibration.

Figure 5:
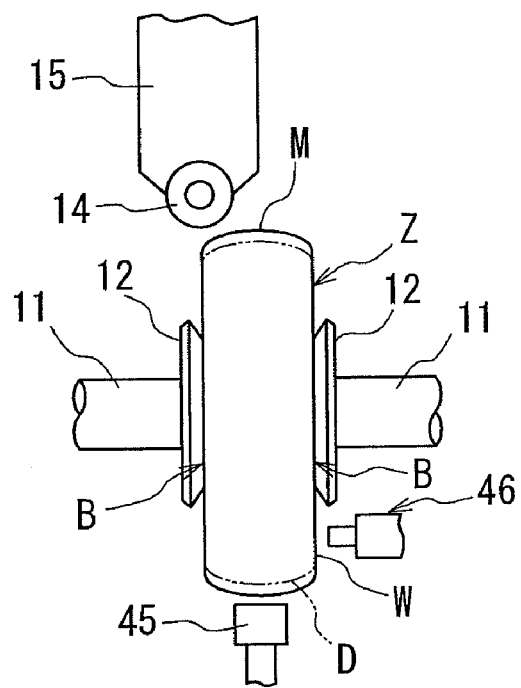
FIG. 5 is a partial plan view of a buffing machine showing another embodiment of the present invention.

FIG. 5 shows another embodiment of the present invention. In this method, a measurement sensor 45 is provided in a frame of said buffing machine 18 and while the rubber gauge G on the outermost belt cord L is measured with this measurement sensor 45, the tread rubber M is removed from the used tire Z with a buff rotating body 14 in circumferentially distant location of the same tire. After the rubber gauge G is measured as mentioned above, a mark is put on a line connecting the minimal location S, in which said rubber gauge G is minimal, and the rotation axis, on the outer surface of the base tire D, preferably on the outer surface of a side wall portion W of the base tire with a marking means 46.

In this way, the measuring process of the rubber gauge G and the removing process of the tread rubber M can be performed substantially at the same time to improve the operation efficiency and to facilitate the subsequent attaching process of the retread rubber T, that is, the arranging process of the joint part F of the retread rubber T in the minimal location S, which can be performed with reference to said mark. Other configurations and operations are similar to those of the above-mentioned embodiment.

In the above-mentioned embodiment, the rubber gauge G on the outermost belt cord L is measured with a contactless eddy-current displacement sensor. Alternatively, in the present invention, the rubber gauge G on the outermost belt cord L may be measured with a contact ultrasonic measurement sensor and the minimal location S may be measured with a known balancer.

The present invention can be applicable to an industrial field of a retreaded tire, in which retread rubber is attached to a buffed surface of a base tire.

The invention claimed is:

1. A method for producing a retreaded tire comprising:
   removing tread rubber from a used tire having a belt consisting of at least one belt layer and the tread rubber to obtain a base tire,
   measuring a rubber gauge on a buffed surface of the base tire over an entire circumference of the buffed surface from which the tread rubber has been removed, the rubber gauge measured in a radial direction of the tire, from the buffed surface to an outer surface of an outermost belt cord embedded in an outermost belt layer disposed in a radially outermost side among belt,
   attaching retread rubber on the buffed surface of the base tire over the entire circumference of the buffed surface, a leading end part of the retread rubber being arranged to overlap with a location on the base tire, in an equatorial plane of the tire, where the rubber gauge is minimal on the circumference, to form a joint part of the retreaded tread rubber at the minimal location of the rubber gauge, and
   vulcanizing the base tire to which the retread rubber has been attached to obtain a retreaded tire,
   wherein the rubber gauge is measured with a contactless measurement sensor,
   wherein the contactless measurement sensor is an eddy-current displacement sensor, and
   wherein the belt cords are made of steel.

2. The method for producing a retreaded tire according to claim 1, wherein the rubber gauge is measured at given intervals or in a continuous fashion while the base tire is rotated around its rotation axis at a given rotating speed.

3. The method for producing a retreaded tire according to claim 1, wherein an arithmetic expression depending on a kind of used tire is utilized when the rubber gauge is calculated based on a measurement signal from the measurement sensor.

4. The method for producing a retreaded tire according to claim 1, wherein the measuring of the rubber gauge and the attaching of the retread rubber to the buffed surface are separately performed in circumferentially distant locations of the same tire.

5. The method for producing a retreaded tire according to claim 1, wherein the measuring of the rubber gauge and the removing of the tread rubber from the used tire are separately performed in circumferentially distant locations of the same tire, and the method further comprising putting a mark on the minimal location of the rubber gauge on the outer surface of the base tire.

* * * * *